W. OLCOTT.
CORN PULP REMOVER.
APPLICATION FILED MAR. 30, 1920.

1,345,456.

Patented July 6, 1920.

Walter Olcott
INVENTOR.

BY

Huth Sutherland
ATTORNEY.

UNITED STATES PATENT OFFICE.

WALTER OLCOTT, OF SOUTH MANCHESTER, CONNECTICUT.

CORN-PULP REMOVER.

1,345,456.  Specification of Letters Patent.  Patented July 6, 1920.

Application filed March 30, 1920. Serial No. 369,922.

*To all whom it may concern:*

Be it known that I, WALTER OLCOTT, a citizen of the United States, residing at South Manchester, in the county of Hartford and State of Connecticut, have invented certain new and useful Improvements in Corn-Pulp Removers, of which the following is a specification.

This invention relates to what I shall for convenience term a corn pulp remover. This title is used primarily for the fact that this is the initial function of the implement, it being employed as may be inferred for removing the pulp of the corn from a cob for example in canning. I have several motives in view among them being the provision of an article of the character set forth which is capable of inexpensive construction, easy and readily manipulated and by which the pulp of corn may be stripped or cleaned from the cob in a rapid, thorough manner. The device possesses other features of novelty and advantage which with the foregoing will be set forth in the following description wherein I will outline in detail that form of embodiment of the invention which I have selected for illustration in the drawings accompanying and forming part of the present specification. I am in no sense restricted to this disclosure. I may depart therefrom in several respects within the scope of the invention defined by the claim following said description.

Referring to said drawings.

Like characters refer to like parts throughout the several views which are on different scales.

Figure 1:
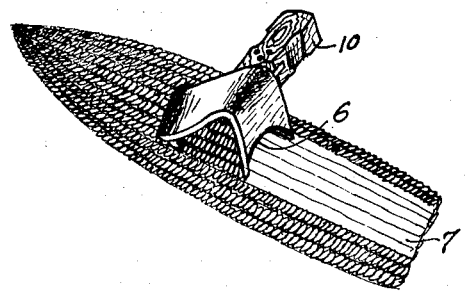
Figure 1 is a perspective view of an ear of corn with the implement positioned thereon for removing the pulp, a portion of the handle being broken away.
Figure 2:
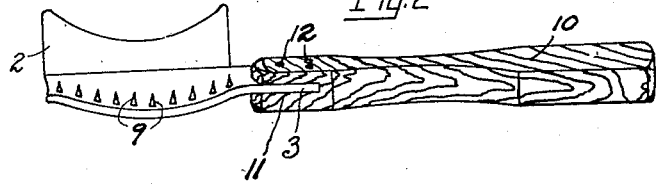
Fig. 2 is a perspective view from the front of the implement inverted and the rear end of the handle broken away.
Figure 3:
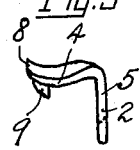
Fig. 3 is a front elevation.
Figure 4:
Fig. 4 is a side elevation, only a portion of the handle appearing in the latter.
Figure 5:
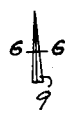
Fig. 5 is a front elevation of a cutting tooth.
Figure 6:
Fig. 6 is a cross section on the line 6—6 of Fig. 5.
Figure 7:
Fig. 7 is a side elevation of said cutting tooth.

The device involves in its makeup a suitable head which is moved along an ear of corn for instance through the agency of a handle to be grasped by the user. The head shown for the purpose is denoted in a general way by 2 and it is virtually right angular in cross section having as shown a rearwardly extending tang 3 projecting from the upper flange 4 of the head, the rear flange 5 of the head extending downwardly from the back end of the upper flange. The rear flange which is practically longitudinally straight, has in its lower edge a concavity 6 adapted to conform approximately to the transverse curvature of the ear 7. The upper flange 4 as shown clearly in Figs. 2 and 3 is concavo-convex in form, the concaved face being downward. At its front edge this flange 4 has an upturned lip 8 of arcuate form. To the flange 4 in the inner surface thereof and in proximity to the front edge of the flange is a row of cutting teeth 9 the sides of which are flat and the front edges of which are acute or sharp, the fronts of the teeth also being bent or curved in a rearward direction. These teeth 9 are comparatively closely arranged and extend in an arcuate row practically the length of the flange 4. The cutting teeth 9 act like a row of knives their front edges which as I have intimated being generally of arcuate formation, cutting or slitting the kernels to facilitate the expressing or squeezing of the pulp from the kernels.

To manipulate the implement a handle as 10 of suitable material is provided and as shown it has near its front end a slot or opening 11 in which the flat tang 3 is closely fitted and there securely held as by rivets 12 extending through the handle and also through the tang.

In action the cutting teeth 9 are generally laid upon the rear end surface of the corn cob with the concaved edge of the back flange 5 fitting the extreme back end of the cob. The handle is then grasped and the head 2 of the implement drawn along the kernels. The cutting edges of the teeth 9 cut the kernels to their bases or to the cob and as the head longitudinally traverses the cob the pulp is squeezed from the slit kernels by the edge of the flange 5. The pulp squeezed from the kernels by the pressure of the flange 5 passes out of the space between said flange and the companion flange 4.

The article covered herein can of course be used successfully with various kinds of corn on the cob. There is a row of cutters or knives which cut or slit the kernels, constituting a suitable means for the purpose, and following this comes means for scraping the pulp from the kernels.

What I claim is:

A corn pulp remover comprising a head having flanges approximately at right angles to each other, one of the flanges being in front of the other as the head is moved along on the cob, the front flange being furnished with a row of teeth disposed in arcuate order, the fronts of the teeth having acute cutting edges to cut the kernels of corn on such movement, the back flange having a longitudinal concavity in its under edge, and acting to squeeze the pulp from the kernels after they have been cut on such movement, said back flange having a rearwardly-extending tang at practically right angles to the line of movement of the head.

In testimony whereof I affix my signature in the presence of two witnesses.

WALTER OLCOTT.

Witnesses:
HEATH SUTHERLAND,
ESTHER T. JOHNSON.